Dec. 17, 1963   F. T. WILSON   3,114,229
ROTARY MOWER BLADE HEIGHT ADJUSTER
Filed May 25, 1962   3 Sheets-Sheet 1

INVENTOR
Floyd T. Wilson by Robert U. Geib Jr.
Attorney

Dec. 17, 1963   F. T. WILSON   3,114,229
ROTARY MOWER BLADE HEIGHT ADJUSTER
Filed May 25, 1962   3 Sheets-Sheet 2
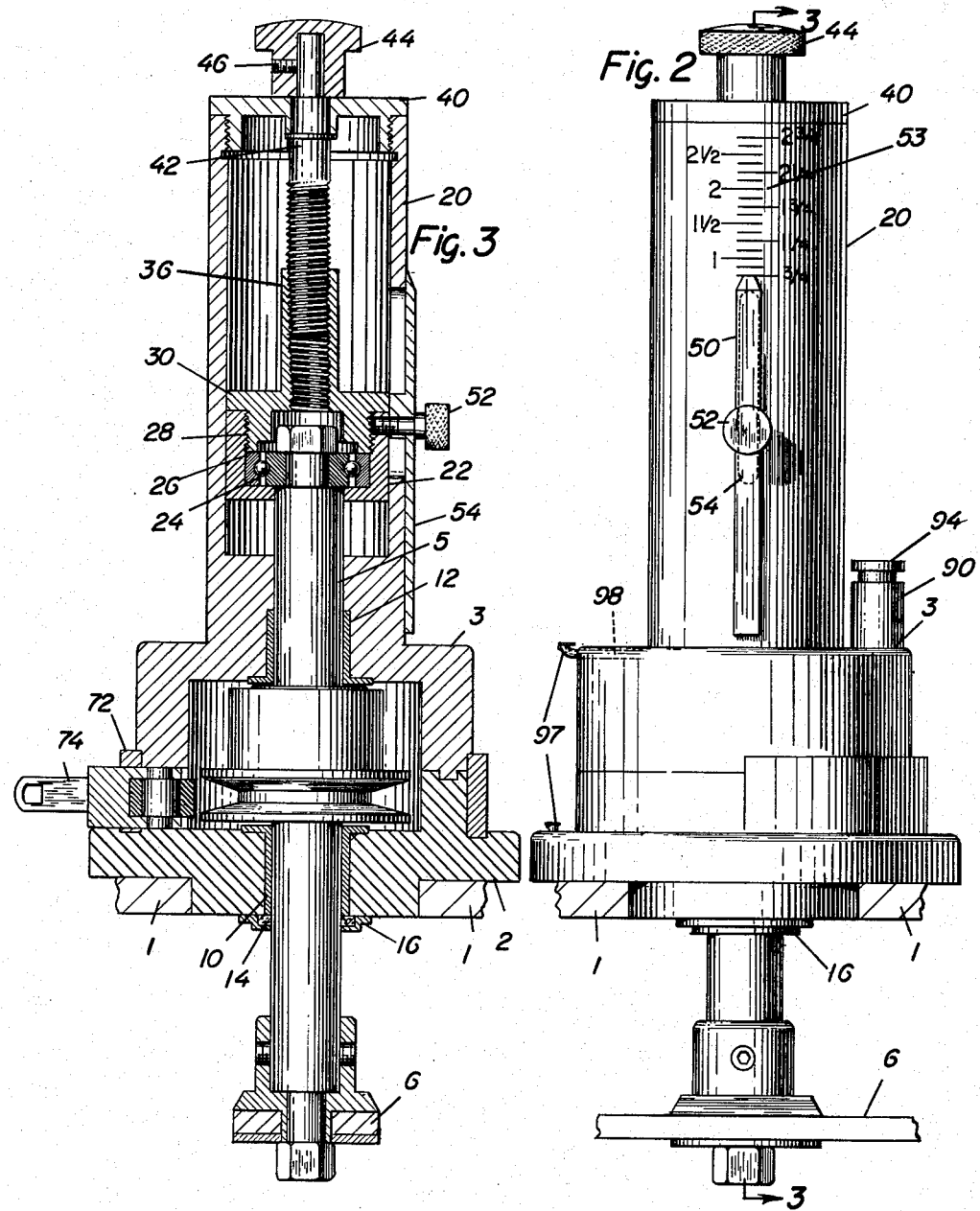
INVENTOR
Floyd T. Wilson
by Robert U. Geil, Jr.
Attorney

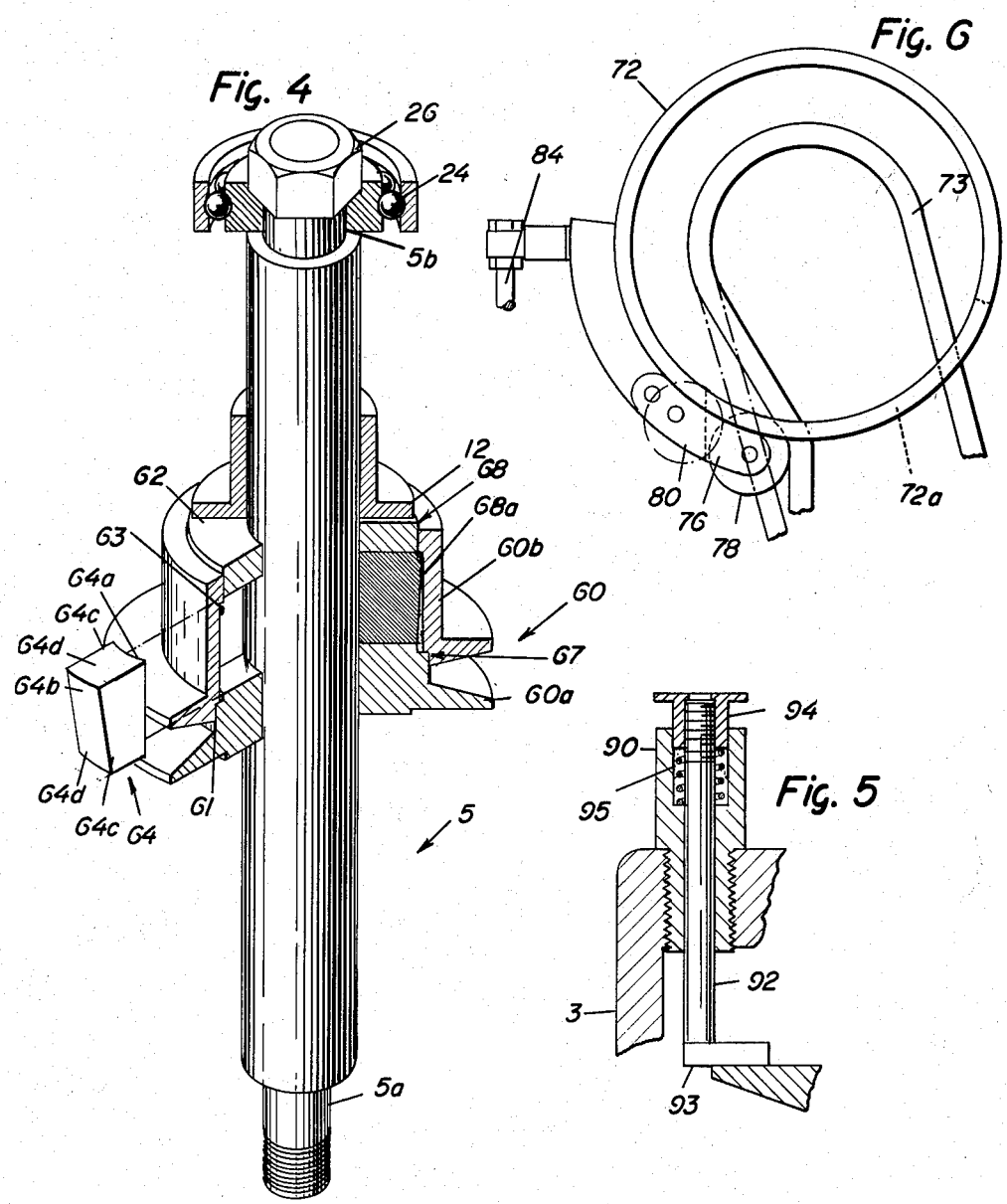

3,114,229
ROTARY MOWER BLADE HEIGHT ADJUSTER
Floyd Thomas Wilson, 1105 E. 7th Ave., Gary, Ind.
Filed May 25, 1962, Ser. No. 197,624
2 Claims. (Cl. 56—25.4)

This invention relates to mowers for cutting grass and weeds, and particularly to those of the type embodying a wheel-supported body having an upper plate or deck with a rotatable shaft extending vertically therethrough, the said shaft being driven by a motor or engine mounted upon the upper plate or deck, and a rotary blade or cutter disposed beneath the deck and connected to the lower end of the shaft.

It is among the objects of the present invention to provide improved means for vertically adjusting the cutter blade of a mower of the class described.

Another object is the attainment of the immediate foregoing with an apparatus which is quick and easy to operate, durable in service and comparatively inexpensive and simple to manufacture and install.

Still another object is the provision of improved means embodying a remote control for effecting the desired adjustment, which is preferably located adjacent the propelling handle of the mower, whereby the operator may, from a remote point, readily and expeditiously position the cutter blade at any desired distance above the ground.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings exemplifying this invention, and in which:

FIGURE 2 is an elevational view of the adjusting mechanism for the vertically disposed, rotatable shaft which carries the cutting blade;

FIGURE 3 is a longitudinal cross-section of the apparatus of FIGURE 2;

FIGURE 4 is a perspective of the vertically disposed, rotatable shaft, together with some of the mechanisms associated therewith, which will be specifically described hereinafter;

FIGURE 5 is a sectional view illustrating the clutch release mechanism of the invention; and FIGURE 6 is a top elevation of the clutch mechanism with certain parts thereof broken away.

Figure 1:
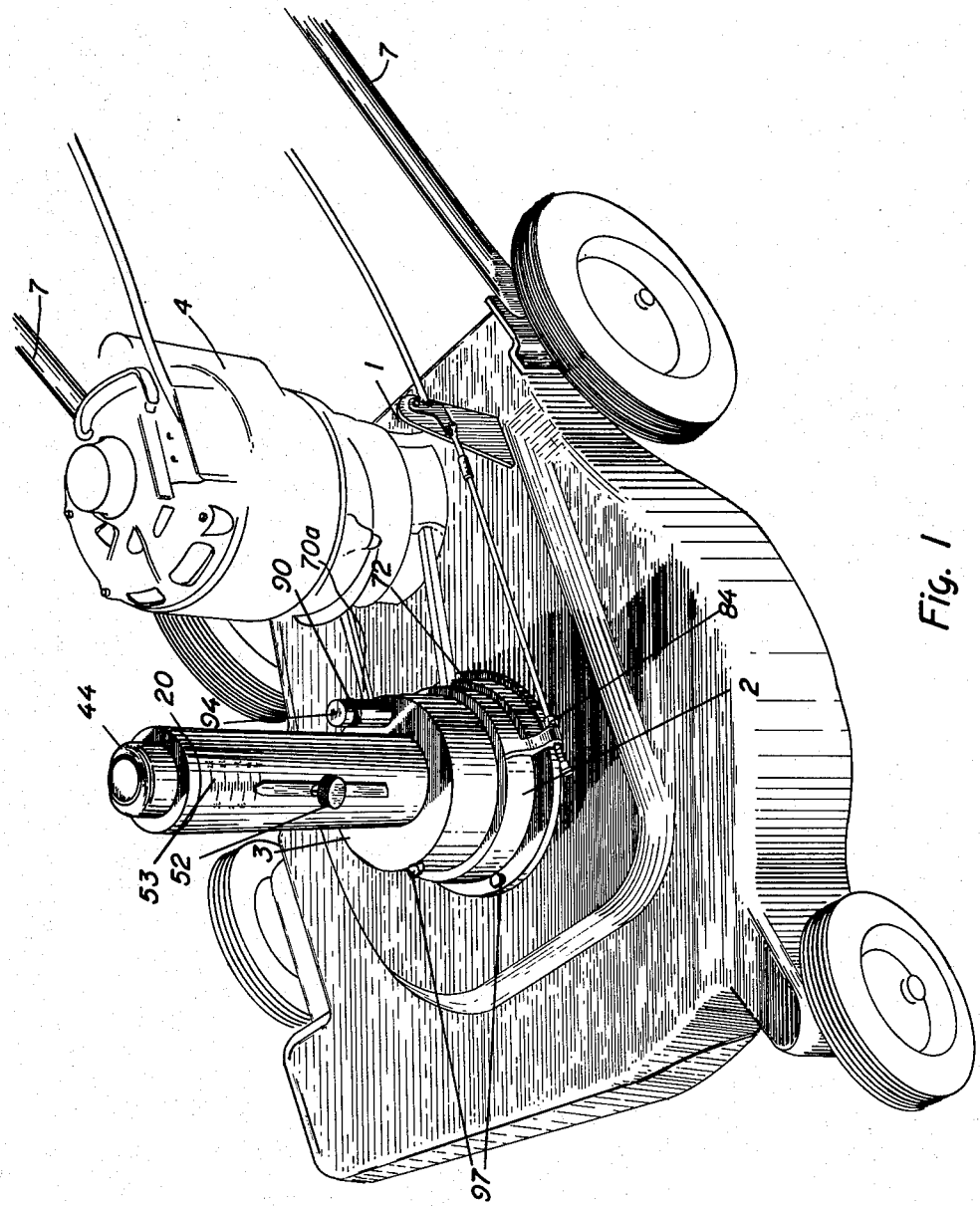
FIGURE 1 is a perspective view of a rotary mower which embodies the apparatus of the present invention.

Referring more particularly to the drawings, the numeral 1 designates the top plate or deck of a rotary mower of the type described hereinbefore.

The apparatus of the present invention comprises a pair of cooperating and aligned lower and upper housing elements, generally indicated at 2 and 3, respectively, the same being adapted for attachment to the top plate or deck 1 and to receive between them a vertically disposed rotatable shaft 5, the ends of which are of reduced diameter as shown at 5a and 5b. The lower end of the rotatable shaft 5 depends from the lower housing 2 and has a rotary mower blade 6 secured to its reduced portion 5a, while the upper end of said shaft projects above the upper housing 3 with its reduced portion 5b connected with vertical adjusting means which will be specifically described hereinafter.

In the embodiment shown, that portion of the lower housing 2 which is of the largest diameter is adapted to seat upon, and be secured to, the top plate 1, with the lower portions thereof depending through a suitable aperture in said top plate. As shown in FIGURE 1, the usual motor or engine 4 is mounted on the top plate or deck 1 in spaced relationship with respect to the lower and upper housings 2 and 3, respectively; and the usual steering handle 7 is pivotally attached to the top plate or deck. The lower housing 2 and the upper housing 3 are provided with bearings or bushings 10 and 12, respectively, which not only journal the vertically disposed rotary shaft 5, but also provide thrust bearings for a purpose to be later described. These bearings 10 and 12 may be ordinary bushings with radial flanges on their most adjacent ends. A felt oil-retainer 14 encircles the rotary shaft 5 immediately below the lower end of the bushing 10 and is maintained in position by means of a removable retainer 16.

Mounted atop the upper housing 3 is a cylindrical housing 20, the lower end of which comprises an abutment with a stepped bore of reduced diameter which closely embraces the peripheries of the rotary shaft 5 and the upper portion of the bushing 12. Disposed in the cylindrical housing 20 is a reciprocable cup 22 which receives a ball bearing 24 which may, if desired, be press-fitted thereinto. The bottom of the cylindrical cup 22 is centrally bored to receive the upper end of the shaft 5 immediately below its portion 5b of reduced diameter, the latter, in turn, being embraced by the inner race of said bearing and projecting thereabove to receive a nut 26 in screw-threaded engagement therewith.

The upper end of the cylindrical cup 22 is interiorly screw-threaded to receive an exteriorly screw-threaded plug 28 which is provided with a radial flange 30 of the same diameter as the cup 22, thereby permitting it to maintain contact with the interior wall of the cylindrical housing 20.

The lower extremity of the cylindrical plug 28 makes firm contact with the upper surface of the outer race of the ball bearing 24, the main portion of the underside of the plug being recessed to receive the nut 26 on the upper end of the rotary shaft 5.

The upper face of the cylindrical plug 28 is provided with an upwardly disposed open-end tubular extension 36 of reduced diameter which is interiorly screw-threaded, as shown. The upper end of the cylindrical housing 20 screw-threadedly engages a cap 40 which is centrally apertured to receive a shaft 42 which is rotatably mounted with respect thereto. The lower end of this rotatable shaft 42 extends into the tubular extension 36 on the plug 28 and screw-threadedly engages the same. The upper extremity of the rotatable shaft 42 projects from the cap 40 and has an adjusting knob 44 secured thereto as by means of a set-screw 46.

The cylindrical housing 20 is also provided with a vertically extending slot 50; and an adjustable lock-screw 52 extends therethrough and screw-threadedly engages an appropriate recess in the side wall of the cylindrical cup 22. This adjustable lock-screw 52 also carries an index plate 54 which is mounted exteriorly of the cylindrical housing 20, the latter being provided with cooperating graduations 53, whereby the exact vertical position of the rotary blade 6 may be quickly observed.

From the foregoing construction and arrangement, it will be perceived that the vertical shaft 5 and the rotary mower blade 6 secured to its lower end may be vertically adjusted by rotation of the knob 44 and the shaft 42 depending therefrom which extends into, and screw-threadedly engages, the interior of the tubular extension 36 on the upper end of the plug 28; and this adjustment, after being checked on the index plate 54 and cooperating graduations 53, is made secure by the lock-screw 52.

As mentioned hereinbefore, another important feature of the present invention is the provision of a belt and pulley drive between the motor or engine 4 and the rotary shaft 5 carrying the mower blade 6 which permits the free vertical movement of this shaft; and this means is shown as comprising a split pulley 60 mounted within the enclosure provided by the lower and upper housings 2 and 3, respectively; the said pulley being shown as of the V type and having a lower element 60a and an upper element 60b.

The lower pulley element 60a comprises an upwardly extending cylindrical hub portion 61 and a superposed cylindrical sleeve 62 which is of lesser diameter. This cylindrical sleeve 62 has a series of rectangular apertures or ports 63 which are shown as being disposed at 120° angles with respect to each other. Each of these apertures or ports 63 receives a jaw member 64 which, when viewed in plan, provides an inner curved surface 64a and an outer curved surface 64b, the radii of which are based on the axis of the vertically extending rotary shaft 5. The side surfaces 64c of the jaw members are straight and parallel to each other, as are the top and bottom surfaces 64d.

It will be noted that, while the radius of the inner curved surface 64a of each of the jaw members 64 is unchanging, the outer curved surface 64b tapers downwardly; or, in other words, the radii of the circle of which it forms a segment constantly increases in an upward direction.

The underside of the upper pulley element 60b has a recess 67 for receiving the upper portion of the cylindrical hub portion 61 on the lower pulley element 60a. The upper pulley element 60b also comprises a superposed generally cylindrical sleeve 68, the upper end of which is slightly reduced internal diameter as indicated at 68a. Thus, the inner wall of the generally cylindrical sleeve 68 is of inverted frusto-conical shape with the lower and larger end thereof terminating at the recess 67 and of slightly smaller diameter.

When the lower and upper pulley elements 60a and 60b are assembled, the cylindrical sleeve 62 is telescoped within the cylindrical sleeve 68 and the jaw members 64 seated in the (rectangular) apertures or ports 63, the inner curved surfaces 64a of the jaw members will be closely adjacent the rotary shaft 5, with the (vertically tapered) outer curved surfaces 64b projecting slightly beyond the cylindrical sleeve 62 for contact with the correspondingly tapered sidewall 68b of the generally cylindrical sleeve 68.

According to the foregoing construction and arrangement, the compartively slight upward movement of the upper pulley element 60b with respect to its lower counterpart, forces the jaw members to firmly grip the rotary shaft 5; and the said shaft will be free to rotate and/ or move vertically upon the downward movement of the upper pulley element.

When the lower and upper pulley elements 60a and 60b are in expanded condition, the over-all height of the split pulley 60 is substantially the same as the distance between the radial flanges on the inner ends of the bushings 10 and 12.

As shown in FIGURE 1, the lower housing 2 is apertured, as at 70a so as to permit a V-belt 73 to be received by the split pulley 60, the said belt being connected to, and driven by, the motor or engine mounted on the deck or top plate of the mower.

The tightening of the V-belt will, of course, force the jaw members 64 to grip the rotary shaft 5 in the manner described.

Referring particularly to FIGURES 3 and 6, the belt-tightener shown in the drawings comprises a partially rotatable cylindrical ring 72 which seats in a circular groove in the upper surface of the bottom plate of the lower housing 2 and extends in contact with the periphery of the upper portion of the lower housing 2 into a recess which is provided therefor in the lower end of the peripheral portion of the upper housing 3.

A slot or aperture 72a (see FIGURE 6) in the cylindrical ring is adapted for registration with the aperture 70 in the lower housing in order that it may likewise receive the V-belt of the mower. Adjacent its belt-receiving aperture 72a, the cylindrical ring 72 carries a pair of parallel arms 76 which extend over said slot and carry a belt-contacting roller 78.

An arm 80 is carried by, and extends radially from, the cylindrical ring 72, and is connected through suitable actuating means generally indicated at 84 to a control device mounted on, or adjacent to, the steering handle 7 of the mower.

The teachings of the present invention also contemplate the provision of means for quickly releasing the clutching effect of the split pulley 60 with respect to the vertical rotary shaft 5, after, of course, the V-belt has been loosened upon the withdrawal of the belt-contacting roller 78 through the clockwise movement of the partially rotatable cylindrical ring 72 by its actuating means 84.

According to the drawings, a vertical sleeve 90 is mounted atop the upper housing 3 adjacent the periphery thereof and communicates with the interior thereof. Disposed in this vertical sleeve 90, and extending downwardly into the upper housing 3 is a plunger 92 carrying a lateral extension or foot 93 which overlies the outer peripheral portion of the upper pulley element 60b. A pressure cap 94 is reciprocably mounted on the upper end of the vertical sleeve 90 and is attached to the upper end of the plunger 92. Accordingly, downward pressure on the pressure cap 94 will cause the foot 93 at the lower end of the plunger 92 to force the upper pulley element 60b downwardly. The pressure cap 94 and plunger 92 are resiliently maintained in upper position by means of a spring 95 within the vertical sleeve 90.

It will be perceived that the elements within the lower housing 2, upper housing 3 and cylindrical housing 20 and their exteriorly disposed actuating means form a unit which provides for the efficient driving of the rotary blade 6 and the efficient and accurate vertical adjustment thereof. In addition, the clutching effect between the jaw members 64 and split pulley 60 is such that it will automatically provide slippage and release when the rotary blade contacts a heavy object, such as a sizeable stone, etc. Also the entire unit formed by the lower housing 2, upper housing 3 and cylindrical housing 20 may be easily and quickly detached from the remainder of the mower for maintenance and the like. Further, the elements within the unit may be easily lubricated; for example, through oil cups 97 and oil ducts or passages 98, or the equivalent thereof.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. A grass cutter comprising a wheel-supported platform having an aperture in the top thereof, a steering handle connected to and extending upwardly from said platform; a vertically disposed tubular housing secured to said platform and extending through said aperture; the lower end of said tubular housing being enlarged and defining a pulley compartment; upper and lower closure members for the ends of said tubular housing; a shaft bearing carried by said lower closure member, a shaft bearing carried by said tubular housing disposed adjacent the upper end of said pulley compartment; a shaft hanger slidably disposed in said tubular housing and in elevated relationship with respect to said last-named shaft bearing; a bearing in said shaft hanger; a shaft rotatably supported by all of said bearings and depending from said lower closure member; a knife blade secured to said shaft adjacent the lower extremity thereof; a pulley disposed in said pulley compartment and in concentric relationship with respect to said shaft; a belt for driving said pulley; said tubular housing having an opening for receiving said belt; means mounted on said platform for driving said belt; clutch means associated with said pulley for selectively gripping and releasing said shaft; said shaft being vertically movable when released by said clutch means, and a vertically adjustable shaft extending through said upper closure member and connected to said shaft hanger.

2. A grass cutter comprising a wheel-supported platform having an aperture in the top thereof, a steering handle connected to and extending upwardly from said platform, a vertically disposed tubular housing secured to said platform and extending through said aperture, the lower end of said tubular housing being enlarged and defining a pulley compartment, upper and lower closure members for the ends of said tubular housing; a shaft bearing carried by said lower closure member; a shaft bearing carried by said tubular housing and disposed adjacent the upper end of said pulley compartment; a shaft hanger slidably disposed in said tubular housing and in elevated relationship with respect to said last-named shaft bearing; a bearing in said shaft hanger; a shaft rotatably supported by all of said bearings and depending from said lower closure member; a knife blade secured to said shaft adjacent the lower extremity thereof, a split-pulley disposed in said pulley compartment and in concentric relationship with respect to said shaft; a belt for driving said split-pulley; said tubular housing having an opening for receiving said belt; means mounted on said platform for driving said belt; means disposed exteriorly of said tubular housing for selectively tightening and loosening said belt; said shaft being vertically movable when released by said split-pulley; and a vertically adjustable shaft extending through said upper closure member and connected to said shaft hanger.

References Cited in the file of this patent
UNITED STATES PATENTS

| | | |
|---|---|---|
| 2,329,185 | Coddington | Sept. 14, 1943 |
| 2,485,984 | Newman | Oct. 25, 1949 |
| 2,883,024 | Emrick | Apr. 21, 1959 |
| 2,926,926 | Rowe et al. | Mar. 1, 1960 |
| 2,960,810 | Musgrave | Nov. 22, 1960 |